Patented Dec. 9, 1941

2,265,200

UNITED STATES PATENT OFFICE 2,265,200

PROCESS OF PREPARING PROPYLENE OXIDE SULPHONIC ACID

Walter Schmidt, Frankfort-on-the-Main, Germany, assignor, by mesne assignments, to General Aniline & Film Corporation, New York, N. Y., a corporation of Delaware No Drawing. Application June 28, 1939, Serial No. 281,653. In Germany July 14, 1938

3 Claims. (Cl. 260—348)

The present invention relates to propylene oxide sulphonic acid and to a process of preparing it.

It is known that there is obtained from epichlorhydrin by action of a primary sulphite glycerine-monochlorhydrin-sulphurous acid ester, $Cl-CH_2-CH(OH)-CH_2-OSO_2H$, and by action of a secondary sulphite a salt of 2-hydroxypropane-1.3-disulphonic acid,

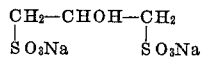

("Berichte der Deutschen Chemischen Gesellschaft", Vol. 61, page 1354).

Now, I have found that, when the reaction of an epichlorhydrin with a secondary sulphite is conducted at high dilution, preferably in a concentration of less than about 10 per cent., the oxide ring is preserved and a sulpho-group takes the place of the chlorine atom in the molecule, for instance as represented by the following equation:

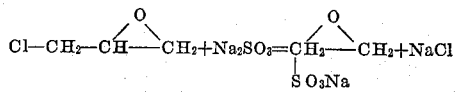

Preferably diluents are used which are capable of dissolving secondary sulphites, such as, for instance, water or an aqueous alcohol. In order to avoid secondary reactions care must be taken that a moderate temperature is maintained.

The propylene oxide sulphonic acid obtainable by the invention is extraordinarily reactive. Due to the presence of the oxide ring it is capable of all addition reactions known for ethylene oxide or propylene oxide. Propylene oxide sulphonic acid may be converted into dihydroxypropanesulphonic acid by action of water, into aminosulphonic acids or substituted aminosulphonic acids by action of ammonia or amines and into hydroxypropanedisulphonic acid by action of acid sulphites. The propylene oxide sulphonic acid is, therefore, a valuable intermediate product, especially for the manufacture of textile adjuvants.

The following example serves to illustrate the invention, but it is not intended to limit it thereto; the parts are by weight:

252 parts of crystallized sodium sulphite are dissolved in 2000 parts of water. The solution is introduced into a stirring device within 25 minutes simultaneously with 95 parts of epichlorhydrin. The initial temperature of the mixture is 12° C. During the reaction the temperature increases to 25° C. and gradually decreases to room temperature. A small amount of unaltered epichlorhydrin is eliminated by extracting it with ether.

In order to determine the yield the aqueous solution of the sodium propylene oxide sulphonate formed is heated at 125° C. to 130° C. with 300 parts of an aqueous methylamine solution of 40 per cent strength for 3 hours at 8-9 atmospheres above atmospheric pressure. When the whole has been evaporated to dryness 136 parts of sodium methylamino-hydroxypropanesulphonate are obtained which correspond with a yield of 71.2 per cent.

I claim:

1. The process of preparing propylene oxide sulphonic acid which comprises reacting at a moderate temperature epichlorhydrin with a normal alkali sulphite in a diluent selected from the class consisting of water and aqueous alcohol, the concentration of epichlorhydrin in the reaction mixture being less than 10 per cent.

2. The process of preparing propylene oxide sulphonic acid which comprises reacting epichlorhydrin with sodium sulphite at moderate temperatures in a diluent selected from the group consisting of water and aqueous alcohol, the concentration of epichlorhydrin in the reaction mixture being less than 10 per cent.

3. The process of preparing propylene oxide sulphonic acid which comprises reacting epichlorhydrin with sodium sulphite in the presence of water as diluent at temperatures up to 25° C., the concentration of epichlorhydrin in the reaction mixture being less than 10 per cent.

WALTER SCHMIDT.